United States Patent
Möhlmann et al.

(10) Patent No.: US 10,435,001 B2
(45) Date of Patent: Oct. 8, 2019

(54) HYDRAULIC ACTIVATION OF A PARKING LOCK

(71) Applicant: GKN Automotive Ltd., Redditch, Worcestershire (GB)

(72) Inventors: Reinhard Möhlmann, Bergisch Gladbach (DE); Sascha Miebach, Neunkirchen-Seelscheid (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 194 days.

(21) Appl. No.: 15/684,969

(22) Filed: Aug. 24, 2017

(65) Prior Publication Data

US 2018/0056958 A1    Mar. 1, 2018

(30) Foreign Application Priority Data

Aug. 26, 2016  (DE) .......................... 10 2016 115 925

(51) Int. Cl.
   *B60T 13/14*     (2006.01)
   *B60T 1/06*      (2006.01)
   (Continued)

(52) U.S. Cl.
   CPC ............ *B60T 13/148* (2013.01); *B60T 1/005* (2013.01); *B60T 1/062* (2013.01); *B60T 13/662* (2013.01);
   (Continued)

(58) Field of Classification Search
   None
   See application file for complete search history.

(56) References Cited

U.S. PATENT DOCUMENTS 9,205,813 B2 * 12/2015 Yokota ................ F16H 63/3416
2002/0092720 A1 * 7/2002 Schafer ................... B60T 1/005
                                                          188/158

(Continued)

FOREIGN PATENT DOCUMENTS

CN       101994825 A       3/2011
CN       102865359 A       1/2013
(Continued)

OTHER PUBLICATIONS

China National Intellectual Property Administration Office Action for Application No. 201710740720.5 dated Jan. 30, 2019 (18 pages; with English translation).

(Continued)

*Primary Examiner* — Mark A Manley
(74) *Attorney, Agent, or Firm* — Bejin Bieneman PLC

(57) ABSTRACT

In order to provide a hydraulic actuating system for actuating a parking lock of a motor vehicle, which hydraulic actuating system manages with as few components as possible which are simple, robust, relatively insusceptible to faults and inexpensive, with a simultaneously low installation space requirement, and the hydraulic layout of which hydraulic actuating system makes a simple actuation and a simple movement possible for locking and unlocking the parking lock, it is provided that a pumping device which can operate bidirectionally with a locking delivery direction and with a releasing delivery direction is used as pumping device, and check valves are arranged in the hydraulic circuit in such a way that, by way of actuation of the pumping device in the locking delivery direction, the parking lock moves into the locked position and, upon actuation of the pumping device in the releasing delivery direction, the parking lock moves into the released position.

14 Claims, 1 Drawing Sheet

(51) Int. Cl.
*F16D 63/00* (2006.01)
*B60T 17/22* (2006.01)
*B60T 13/66* (2006.01)
*B60T 17/04* (2006.01)
*B60T 17/02* (2006.01)
*B60T 13/68* (2006.01)
*B60T 1/00* (2006.01)

(52) U.S. Cl.
CPC ............ *B60T 13/686* (2013.01); *B60T 17/02* (2013.01); *B60T 17/04* (2013.01); *B60T 17/22* (2013.01); *F16D 63/006* (2013.01)

(56) References Cited

U.S. PATENT DOCUMENTS

| | | | |
|---|---|---|---|
| 2004/0189082 A1* | 9/2004 | Huber, Jr. | B60T 7/10 303/116.4 |
| 2007/0283735 A1 | 12/2007 | Schweiher et al. | |
| 2008/0214350 A1* | 9/2008 | Powell | F16H 63/3483 475/121 |
| 2013/0306431 A1 | 11/2013 | Ruehle | |
| 2014/0214269 A1* | 7/2014 | Knechtges | B60T 13/588 701/34.4 |
| 2014/0360302 A1* | 12/2014 | Lundberg | F16H 61/0021 74/473.11 |

FOREIGN PATENT DOCUMENTS

| | | |
|---|---|---|
| CN | 103075505 A | 5/2013 |
| CN | 103423442 A | 12/2013 |
| DE | 10136425 B4 | 10/2009 |
| DE | 10 2014 216 648 A1 | 3/2015 |
| DE | 102012017292 B4 | 3/2017 |
| EP | 2587097 B1 | 8/2014 |
| JP | 2000272486 A | 10/2000 |
| JP | 2003074606 A | 3/2003 |
| JP | 2005180620 A | 7/2005 |
| JP | 2005282483 A | 10/2005 |
| JP | 2009227022 A | 10/2009 |
| JP | 2014134243 A | 7/2014 |
| JP | 2015525862 A | 9/2015 |

OTHER PUBLICATIONS

Japanese Patent Office Notice of Reason for Rejection for JP Patent Application No. 2017-163116 dated Jan. 29, 2019 (7 pages; with English translation).

* cited by examiner

HYDRAULIC ACTIVATION OF A PARKING LOCK

CROSS-REFERENCE TO RELATED APPLICATIONS

This application claims priority to German Application No. DE 10 2016 115 925.5, filed on Aug. 26, 2016, which application is hereby incorporated herein by reference in its entirety.

BACKGROUND AND SUMMARY

The present disclosure relates to a hydraulic actuating system for actuating a parking lock of a motor vehicle, comprising:
- an actuator for transferring the parking lock out of a released position into a locked position and/or out of the locked position into a released position,
- a pumping device for generating a hydraulic pressure which transfers the parking lock into the locked position or the released position by means of the actuator,
- a hydraulic circuit, via which the pumping device is connected to the actuator, a first line section and a second line section being provided in the hydraulic circuit, which line sections act at least in sections in a manner which is dependent on the actuation of the actuating system as a pressure feed line which leads to the actuator or as a return line which leads away from the actuator.

A motor vehicle having a hydraulic actuating system of this type, a method for actuating a system of this type, a computer program product for an electronic control unit for actuating a system of this type, and a corresponding electronic control unit are likewise included in this disclosure.

Hydraulic actuating systems for actuating parking locks are generally known. FIG. 1 shows a system which is known to the applicant from practice. It is a disadvantage of a system of this type that a comparatively expensive 4/2-way slide valve has to be provided, in order for it to be possible for the different line sections which lead to the actuator to be used in a targeted manner as a pressure feed line or as a return line. Moreover, as a consequence of its design, the slide valve to be provided is sensitive to contaminations within the line sections. In addition, a locking latching means which is to be actuated via a control apparatus is provided, which locking latching means prevents the actuator which is under prestress from being pressed back into the locked position, which latching locking means has to be additionally actuated and creates additional component and installation space requirements.

Provided herein is a hydraulic actuating system for actuating a parking lock of a motor vehicle, which hydraulic actuating system manages with as few components as possible which are simple, robust, relatively insusceptible to faults and inexpensive, with a simultaneously low installation space requirement, and the hydraulic layout of which hydraulic actuating system makes a simple actuation and a simple movement possible for locking and unlocking the parking lock.

With regard to the hydraulic actuating system, advantageously the pumping device can operate bidirectionally with a locking delivery direction and with a releasing delivery direction, and check valves are arranged in the hydraulic circuit in such a way that, by way of actuation of the pumping device in the locking delivery direction, the parking lock moves into the locked position and, upon actuation of the pumping device in the releasing delivery direction, the parking lock moves into the released position.

With regard to the method, advantageously the pumping device is actuated in a releasing delivery direction for pressure loading of the first line section, in order to transfer the parking lock into the released position by means of the actuator, and the pumping device is actuated in the locking delivery direction for pressure loading of the second line section, in order to transfer the parking lock into the locked position by means of the actuator.

It can be provided that, upon actuation of the pumping device in the locking delivery direction, the second line section is exclusively loaded with pressure and acts as a pressure feed line to the actuator, whereas the first line section acts as a return line, and, upon actuation of the pumping device in the releasing delivery direction, the first line section is exclusively loaded with pressure and acts as a pressure feed line to the actuator, whereas the second line section acts as a return line.

As a result of these measures, an expensive 4/2-way slide valve which tends to be sensitive to dirt can be dispensed with. The actuation of the hydraulic actuator and the targeted actuation and utilization of the first line section or the second line section as a pressure feed line or return line and therefore the transfer of the parking lock into the released position or into the locked position can take place solely via the selection of the delivery direction of the pumping device. The hydraulic actuator can be controlled via the pressure which is generated by the pumping device and/or the rotational speed of the said pumping device to be precise both for controlled release and for controlled engagement of the parking lock.

The pumping device which can be driven by an electric motor can be a rotary pump which can operate bidirectionally, e.g., a gerotor pump. The locking delivery direction and the releasing delivery direction are then functionally equivalent to a locking rotational direction and a releasing rotational direction, respectively, of the pump.

In one advantageous refinement, a first check valve is arranged in the first line section, and a second check valve is arranged in the second line section. The check valves can be configured as passive check valves. In this context, "passive" means that they do not require active (electric) actuation by way of an electronic control unit, but rather are controlled as it were automatically solely by way of the pressure conditions which prevail in the hydraulic circuit. The check valves can also be called purely pressure-controlled check valves.

Moreover, the provision of passive or purely pressure-controlled check valves of this type makes it possible to configure the check valves as seat valves ("seat type valves"). In comparison with, for example, electromagnetically actuated slide valves ("spool type valves"), they are less sensitive to dirt, can be loaded more highly, are less susceptible to leaks, and are of simpler construction and therefore considerably less expensive.

It is provided that the first check valve and the second check valve in each case have a throughflow direction and a closing direction, and are arranged in the respective line section in such a way that, upon pressure loading of the line section, in which it is arranged, the respective check valve is loaded in the closing direction by way of the pumping device. As a result, the optional pressure loading of the first line section or the second line section in a manner which is dependent on the delivery direction of the pumping device is regulated automatically, without a further control intervention being required.

In order to utilize the system not only for the actuation of a parking lock, but also for the supply of further components with cooling and/or lubricating oil, the hydraulic actuating system can be provided with a hydraulic supply section which is connected to the first line section, in order to supply assembly components of an assembly which is assigned the hydraulic actuating system with cooling and/or lubricating oil (for instance, a power takeoff unit (PTU), a differential, a transmission or similar drive train assemblies). The fact that the supply section can be connected exclusively to the first and not to the second line section of the hydraulic circuit ensures that the supply section is loaded or can be loaded with pressure only when the first line section is also loaded with pressure (the pumping device delivers in the releasing direction) and the parking lock is therefore situated in the released position, in which a cooling or lubricating oil requirement can occur in certain assembly components, since the vehicle can be driven only in this position. If, in contrast, the second line section is loaded with pressure (the pumping device delivers in the locking direction) and the said second line section therefore acts as a pressure feed line to the actuator, the parking lock is pressed into the locked position. In the case of a parking lock which is situated in the locked position, the vehicle is necessarily at a standstill and there is no appreciable cooling or lubricating oil requirement from the outset for any assembly components such as bearings or gearwheels.

In one advantageous refinement, a control valve can additionally be arranged in the supply section, via which control valve at least one part of the supply section, but preferably the supply section overall, can be closed or can be switched to throughflow. This makes it possible to switch off the cooling or lubricating oil supply which takes place via the supply section even in the case of a pressurized first line section and therefore in the case of a parking lock which is situated in the released position, and/or to use the said cooling or lubricating oil supply only when there is also actually a cooling or lubricating oil requirement.

Oiling orifices for defined limiting of the cooling and/or lubricating oil flow can be provided in the supply section. The dimensioning of the passage cross section of the throughflow orifices is firstly of such great magnitude and adapted to the components to be oiled in such a way that sufficient component oiling is ensured in the case of the pressure conditions which prevail during operation, and is secondly of such small magnitude and adapted to the pumping device in such a way that, even in the case of a supply section which is switched to throughflow, the pumping device is capable of building up a sufficient pressure, in order to press the parking lock into the released position or to hold it there.

It is provided in one example that the electric pump control current (the electric current which is fed to the electric motor which drives the pumping device) is used to control the hydraulic pressure which is provided by the pumping device. On the basis of the large proportionality of the pump control current and the pump torque and therefore on the basis of the large proportionality of the pump control current and the hydraulic pressure which is provided by the pumping device, the said hydraulic pressure which prevails in the system can be indicated by using the pump control current. A sensor system which detects the pump control current can therefore serve indirectly as a pressure sensor.

The system can have, in particular, a control logic means which uses the pump control current to control the system and/or to detect or monitor system states. It can be provided, in addition, that, moreover, the rotational speed and/or the rotational direction of the pump are/is detected by the system and are/is evaluated for electronic determination of the system status. To this end, the pumping device or the drive train which drives the pumping device can have a rotational speed and/or rotational direction detection means. By way of the detection of the said variables, conclusions about the system state can be drawn when corresponding computing operations are carried out. For instance, conclusions about the position of the actuator can be drawn by way of detection of the rotational speed with a knowledge of the delivery volume of the pumping device and the volume of the pressure chambers and relevant line sections.

Further features and advantages are seen in the dependent claims and from the following description of example embodiments using the drawings, in which:

FIG. 1 shows a concept for hydraulically actuating a parking lock of a motor vehicle, which concept is generally known from the prior art.

Figure 1:
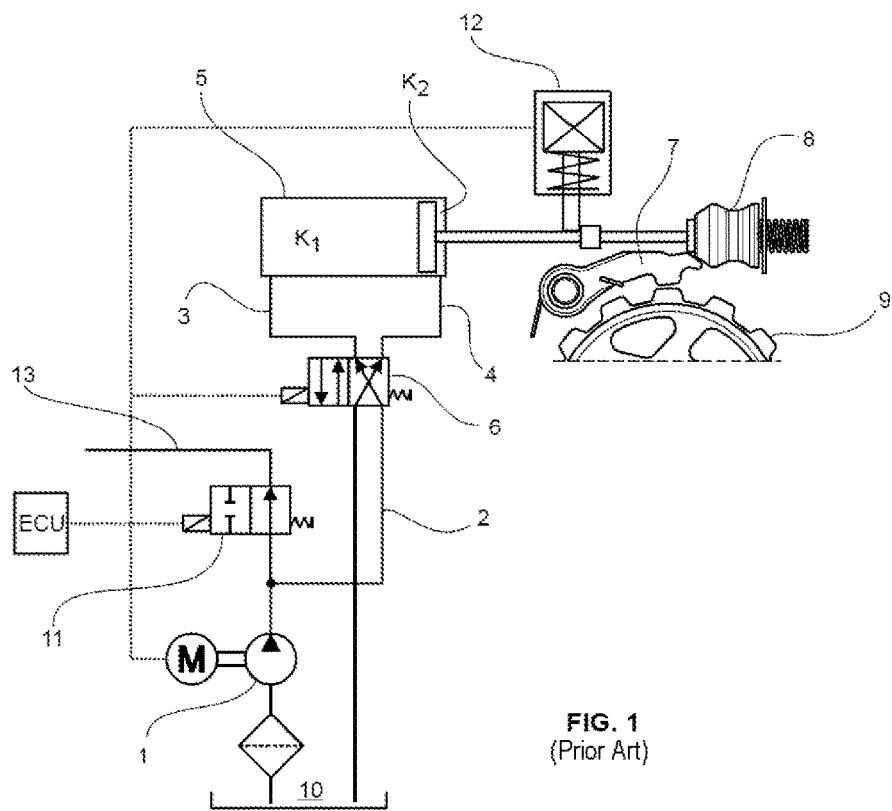
FIG. 1 shows an actuating system for hydraulically actuating a parking lock of a motor vehicle in accordance with the prior art.

Hydraulic pressure is built up in a pressure line 2 via a pumping device 1 which is driven by means of an electric motor M. The pressure line is connected to an electromagnetically actuatable 4/2-way slide valve 6 (4/2-way "spool type solenoid valve"), by means of the switching of which a first line section 3 or a second line section 4 can selectively be used as a pressure feed line which leads to an actuator 5, whereas the respective other line section acts as a largely pressure-free return line.

Upon loading of the first line section 3 with hydraulic pressure (this corresponds to that position of the slide valve 6 which is shown in FIG. 1), the parking lock is transferred into a released position by means of the actuator 5. In the said released position, an engagement lever 7, prestressed via a spring, of the parking lock is out of engagement with a corresponding counterpiece, a locking ring 9 here by way of example, which interacts in a manner which is not shown in the figure with a part of the drive train in such a way that the parking lock is activated in the case of an engagement lever 7 which is in engagement with the locking ring 9.

If, starting from the position which is shown in FIG. 1, the 4/2-way slide valve 6 is switched, the second line section 4 is loaded with pressure. The actuator pulls an actuating cam 8 out of the position shown in FIG. 1 against the engagement lever 7, with the result that the latter comes into a positive locking engagement with the locking ring 9 (locked position of the parking lock). The first line section 3 then serves as a largely pressure-free return line, whereas the second line section 4 serves as a pressure feed line to the actuator 5.

In order to hold the parking lock in the released position shown in FIG. 1, a locking latching means 12 which can be actuated via a control apparatus (ECU) is provided, which locking latching means 12 is capable of acting on the actuator 5, in order to hold the latter in a position which ensures the released position of the parking lock.

A hydraulic control valve 11 is connected to the pressure line 2, via the switching of which hydraulic control valve 11 pressurized oil can be removed from the hydraulic circuit shown in FIG. 1 and can be fed to other assembly components via a supply section 13.

Figure 2:
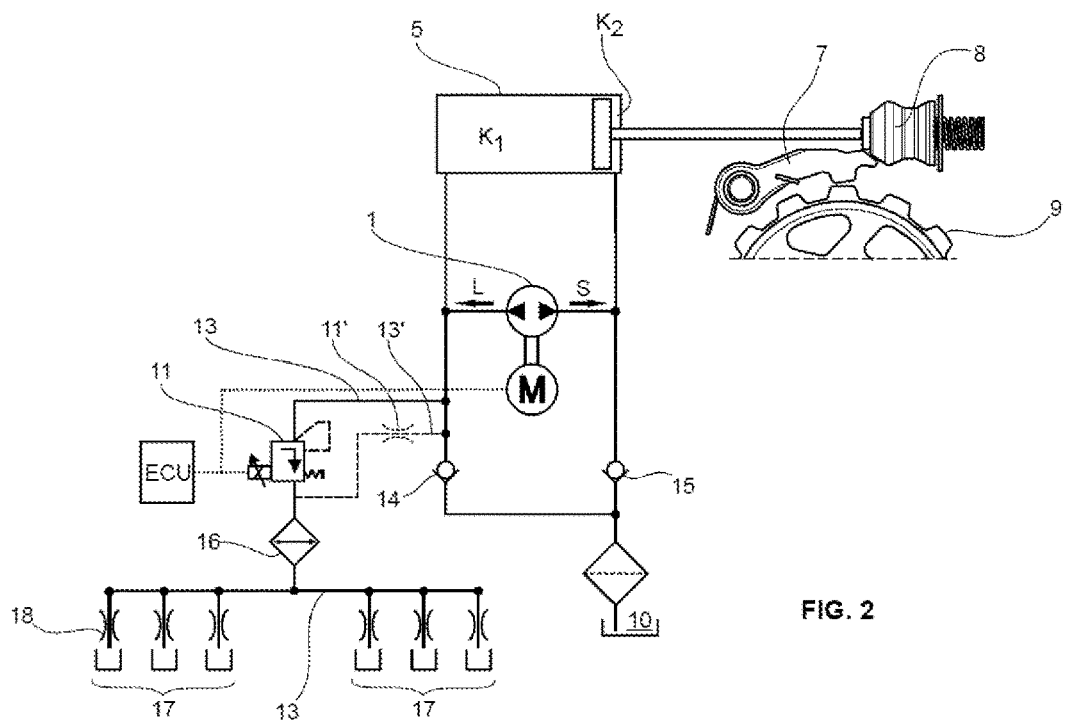
FIG. 2 shows an actuating system for hydraulically actuating a parking lock of a vehicle with a pumping device which can operate bidirectionally.

FIG. 2 shows an example hydraulic actuating system for actuating a parking lock of a motor vehicle. In FIG. 2, the reference numerals which have already been used in FIG. 1 are retained, in so far as the said reference numerals are allocated to functionally identical components.

In FIG. 2, a pumping device 1 is driven by electric motor by means of the motor M. The pumping device 1 can operate bidirectionally, that is to say it can be driven in two rotational directions, namely a locking rotational direction and a releasing rotational direction, and can deliver hydraulic liquid in a locking delivery direction "S" or in a releasing delivery direction "L" in accordance with the rotational direction, in which it is operated.

If the pumping device 1 delivers the hydraulic liquid in the locking delivery direction "S", a second line section 4 is loaded with pressure and acts as a pressure feed line to the actuator 5. In the case of the said delivery direction "S", the actuator 5 is loaded with pressure in such a way that it transfers the parking lock out of the released position shown in FIG. 2 into a locked position, by the actuator pressing an actuating cam 8 out of the position shown in the figure against the engagement lever 7, with the result that the latter comes into a positively locking engagement with the locking ring 9 (locked position of the parking lock, as has already been described with respect to FIG. 1). The first line section 3 then serves as a largely pressure-free return line, the hydraulic liquid being pumped out of a first pressure chamber $K_1$ of the actuator via the pumping device 1 into a second pressure chamber $K_2$ of the actuator and therefore back into the actuator again, in order to load the actuator with pressure in another direction of action.

If the pumping device 1 delivers the hydraulic liquid in the releasing delivery direction "L", the first line section 3 is loaded with pressure and acts as a pressure feed line to the actuator 5. In the case of the said delivery direction "L", the actuator is loaded with pressure in such a way that it transfers the parking lock into the released position shown in FIG. 2. The second line section 4 then serves as a largely pressure-free return line, and the hydraulic liquid volume which is displaced out of the second pressure chamber $K_2$ of the actuator 5 is fed under pressure via the pumping device to the first line section 3 during the actuator actuation, from where it can be fed to the first pressure chamber $K_1$.

In each case one check valve is arranged both in the first line section 3 and in the second line section 4 between the pumping device 1 and a hydraulic liquid reservoir 10. A first check valve 14 prevents a return flow or the return delivery of hydraulic liquid into the hydraulic liquid reservoir 10 out of the first line section 3, and a second check valve 15 prevents a return flow or the return delivery of hydraulic liquid into the hydraulic liquid reservoir 10 out of the second line section 4. When the respectively associated line section is loaded with pressure, the two check valves 14, 15 are situated in a closed position. At the same time, the two check valves 14 and 15 make it possible that the pumping device 1 can suck in hydraulic liquid out of the hydraulic liquid reservoir 10 independently of the delivery direction of the said pumping device 1, when the said pumping device 1 is to convey a hydraulic liquid volume which goes beyond the chamber volume of the actuator. Therefore, the arrangement of the check valves 14, 15 makes it possible to suck in hydraulic liquid from the reservoir 10 in both delivery directions "L" and "S" of the pumping device 1.

A supply section 13 or a supply line is connected exclusively to the first line section 3. As FIG. 2 shows, a control valve 11, e.g., a VBS ("Variable Bleed Solenoid"), can be provided in the supply section 13, via which control valve 11 the supply line can be closed or switched to throughflow. If the control valve 11 switches the supply line 13 to throughflow, oiling points 17 for oiling components (gearwheels, bearings, etc.) can be supplied with cooling and/or lubricating oil, advantageously with an oil cooler 16 connected in between. The oiling points are provided with oiling orifices 18, the active diameters of which are adapted to the oiling requirement and the prevailing pressure conditions.

By virtue of the fact that, unlike in the case of the actuating system which is shown in FIG. 1, the supply section 13 is connected exclusively to the first line section 3, the supply section is likewise loaded with pressure only when the first line section 3 is also loaded with pressure, that is to say when the pumping device 1 delivers in the releasing delivery direction "L" and the vehicle can be moved at all as a consequence of the parking lock which is situated in the released position.

Instead of the control valve 11 which is shown in FIG. 2, a hydraulic orifice 11' can also be provided as an alternative, by means of which hydraulic orifice 11' the passage cross section of a supply line 13' is reduced in a defined manner. In FIG. 2, the orifice 11' and the supply line 13' are shown using dashed lines as an alternative embodiment to the use of a control valve. The orifice 11' forms a main orifice which is positioned upstream of the oiling orifices 18 and by way of the throttling action of which the oil volumetric flow which is fed to the downstream oiling orifices 18 can preferably be set for the entire supply section. The throttling action is set in such a way that, despite the supply section which is permanently set to throughflow on account of the main orifice 13', the pumping device can build up pressure which is sufficient for the actuation of the parking lock.

Although the use of an orifice 11' in the supply line 13' has some disadvantages over the use of a control valve 11 in the supply line 13, for instance a smaller adjustment range of the cooling or lubricating oil volumetric flow, and only continuous oiling of the components which require oiling is possible with an orifice 13' of this type in the case of a pumping device which delivers in the releasing delivery direction L, but not the complete closure of the supply section, the possibility of the variation of the pressure which is provided by way of the pumping device affords a sufficient setting option for many applications of the cooling or lubricating oil volumetric flow which is delivered via the supply line 13'. In addition, if an orifice is used, a control electronics system which addresses a control valve can be dispensed with, and the system becomes considerably less expensive and less complicated overall.

The invention claimed is:

1. A hydraulic actuating system for actuating a parking lock of a motor vehicle, comprising:
   an actuator for transferring the parking lock out of a released position into a locked position and/or out of the locked position into a released position;
   a pumping device for generating a hydraulic pressure which transfers the parking lock into the locked position or the released position;
   a hydraulic circuit, via which the pumping device is connected to the actuator, a first line section and a second line section being provided in the hydraulic circuit, which line sections act at least in part in a manner that is dependent on the actuation of the actuating system as a pressure feed line which leads to the actuator or as a return line which leads away from the actuator;
   wherein the pumping device is a rotary pump and is configured to operate bidirectionally with a locking delivery rotational direction and with a releasing delivery rotational direction, and check valves are arranged in the hydraulic circuit in such a way that, in the case of actuation of the pumping device in the locking delivery rotational direction, the parking lock moves into the locked position and, upon actuation of the pumping device in the releasing delivery rotational direction, the parking lock moves into the released position; and wherein upon actuation of the pumping device in the releasing delivery direction, the first line section is loaded with pressure and acts as a pressure feed line, and, upon actuation of the pumping device in the locking delivery direction, the second line section is loaded with pressure and acts as a pressure feed line; and a supply section is provided which is connected to the first line section, in order to supply assembly components of an assembly with cooling and/or lubricating oil.

2. The system of claim 1, wherein the pumping device is a gerotor pump which can operate bidirectionally.

3. The system of claim 1, wherein a first check valve is arranged in the first line section, and a second check valve is arranged in the second line section.

4. The system of claim 1, wherein the check valves are passive check valves.

5. The system of claim 1, wherein the check valves are configured as seat valves.

6. The system of claim 3, wherein the first check valve and the second check valve each have a throughflow direction and a closing direction and are each arranged in the respective line section in such a way that the respective check valve is loaded in the closing direction upon pressure loading of the respective line section by way of the pumping device.

7. The system of claim 1, wherein at least one control valve is arranged in the supply section, via which control valve at least one part of the supply section can be closed or can be switched to throughflow.

8. The system of claim 7, wherein a main orifice is arranged in the supply section.

9. The system of claim 7, wherein oiling orifices for defined limiting of the cooling and/or lubricating oil flow are provided in the supply section.

10. The system of claim 1, wherein the system has a control logic means, in which the pump control current is used to detect and/or set the hydraulic pressure which is generated by the pumping device.

11. A method for actuating a hydraulic actuating system for actuating a parking lock of a motor vehicle, the system comprising
  an actuator for transferring the parking lock out of a released position into a locked position and/or out of the locked position into a released position;
  a pumping device for generating a hydraulic pressure which transfers the parking lock into the locked position or the released position;
  a hydraulic circuit, via which the pumping device is connected to the actuator, a first line section and a second line section being provided in the hydraulic circuit, which line sections act at least in part in a manner that is dependent on the actuation of the actuating system as a pressure feed line which leads to the actuator or as a return line which leads away from the actuator; and
  a supply section which is connected to the first line section, in order to supply assembly components of an assembly with cooling and/or lubricating oil;
  wherein the pumping device is a rotary pump and is configured to operate bidirectionally with a locking delivery rotational direction and with a releasing delivery rotational direction, and check valves are arranged in the hydraulic circuit in such a way that, in the case of actuation of the pumping device in the locking delivery rotational direction, the parking lock moves into the locked position and, upon actuation of the pumping device in the releasing delivery rotational direction, the parking lock moves into the released position;

the method comprising:
actuating the pumping device in the releasing delivery rotational direction for pressure loading of the first line section, in order to transfer the parking lock into the released position by means of the actuator; and
actuating the pumping device in the locking delivery rotational direction for pressure loading of the second line section, in order to transfer the parking lock in the locking direction by means of the actuator.

12. The method of claim 11, wherein, upon actuation of the pumping device in the releasing delivery direction, a control valve is actuated, in order to close the supply section or to switch it to throughflow.

13. The method of claim 11, wherein the pump control current is used to set and/or detect the hydraulic pressure which is generated by the pumping device.

14. An electronic control unit programmed for actuating a hydraulic actuating system for actuating a parking lock of a motor vehicle, the system comprising
  an actuator for transferring the parking lock out of a released position into a locked position and/or out of the locked position into a released position;
  a pumping device for generating a hydraulic pressure which transfers the parking lock into the locked position or the released position;
  a hydraulic circuit, via which the pumping device is connected to the actuator, a first line section and a second line section being provided in the hydraulic circuit, which line sections act at least in part in a manner that is dependent on the actuation of the actuating system as a pressure feed line which leads to the actuator or as a return line which leads away from the actuator; and
  a supply section which is connected to the first line section, in order to supply assembly components of an assembly with cooling and/or lubricating oil;
  wherein the pumping device is a rotary pump and is configured to operate bidirectionally with a locking delivery rotational direction and with a releasing delivery rotational direction, and check valves are arranged in the hydraulic circuit in such a way that, in the case of actuation of the pumping device in the locking delivery rotational direction, the parking lock moves into the locked position and, upon actuation of the pumping device in the releasing delivery rotational direction, the parking lock moves into the released position;

the electronic control unit comprising programming for:
actuating the pumping device in the releasing delivery rotational direction for pressure loading of the first line section, in order to transfer the parking lock into the released position by means of the actuator; and
actuating the pumping device in the locking delivery rotational direction for pressure loading of the second line section, in order to transfer the parking lock in the locking direction by means of the actuator.

* * * * *